(12) United States Patent
Chiu

(10) Patent No.: US 6,557,587 B1
(45) Date of Patent: May 6, 2003

(54) CHANGE-OVER VALVE

(76) Inventor: Ching-Ping Chiu, P.O. Box 453, Taichung (TW)

( * ) Notice: Subject to any disclaimer, the term of this patent is extended or adjusted under 35 U.S.C. 154(b) by 0 days.

(21) Appl. No.: 09/985,214

(22) Filed: Nov. 2, 2001

(51) Int. Cl.[7] .............................................. F16K 11/07
(52) U.S. Cl. ...................................... 137/801; 137/801
(58) Field of Search ........................... 137/625.48, 801; 251/118; 210/424, 433.1, 449

(56) References Cited

U.S. PATENT DOCUMENTS

| | | | | |
|---|---|---|---|---|
| 3,682,392 A | * | 8/1972 | Kint ........................ | 239/428.5 |
| 3,722,798 A | * | 3/1973 | Bletcher et al. ......... | 239/428.5 |
| 3,853,761 A | * | 12/1974 | McClory .................... | 210/100 |
| 4,650,470 A | * | 3/1987 | Epstein .................... | 137/625.48 |
| 5,279,329 A | * | 1/1994 | Pippel ........................ | 137/801 |
| 5,284,582 A | * | 2/1994 | Yang ........................ | 210/232 |
| 6,093,313 A | * | 7/2000 | Bovaird et al. ............... | 210/94 |
| 6,135,154 A | * | 10/2000 | Chen et al. ............ | 137/625.79 |
| 6,149,801 A | * | 11/2000 | Giordano et al. ............. | 210/87 |
| 6,187,187 B1 | * | 2/2001 | Farley ........................ | 210/223 |

* cited by examiner

Primary Examiner—John Fox

(57) ABSTRACT

A change-over valve comprises a connection portion, a main body, and a switch rod. The main body is connected to the water faucet by the connection portion and is provided with a slide slot, a water discharging channel, and a water discharging cell. The slide slot is provided with a connection duct in communication with a water filter. The switch rod is provided with a small diametrical portion and is slidably disposed in the slide slot such that the small diametrical portion and the slide slot form together a water slot. The switch rod is provided with four washers, two of which are used to separate the flow paths of the water discharging channel and the connection duct, with other two washers serving to make the switch rod and the slide slot leakproof. The water discharging cell is provided with a centrally-located water hole.

1 Claim, 5 Drawing Sheets

CHANGE-OVER VALVE

BACKGROUND OF THE INVENTION

1. Field of the Invention

The present invention relates generally to a valve, and more particularly to a change-over valve.

2. Description of Related Art

As shown in FIGS. 1–3, a prior art change-over valve has a main body 10, which is fastened with a spout 06 of a water faucet 05 by a connection pipe 11. The main body 10 is provided in the interior with a slide slot 12 for receiving a switch rod 20. The switch rod 20 is provided in the midsegment with a small diametrical portion 21, which forms with the slide slot 12 a water slot 22. The water slot 22 displaces as the switch rod 20 is slid in the slide slot 12, so as to enable a water inlet 14 to be in communication with a water outlet 15, as shown in FIG. 3, or with a water filter inlet 30, as shown in FIG. 2. In order to prevent the water leak, four washers 40 and 41 are provided between the switch rod 20 and the slide slot 12. The first washers 40 are disposed in proximity of the water slot 22, whereas the second washers 41 are disposed in two grooves 121 which are located at two longitudinal ends of the slide slot 12. The grooves 121 are formed in the inner wall of the two longitudinal ends of the slide slot 12 at an additional labor cost. In addition, it is time-consuming to put the second washers 41 into the grooves 121 of the slide slot 12. Furthermore, the water outlet 15 is eccentrically located such that the water flow tends to concentrate in one side of a water discharging cell 13, thereby resulting in a nonuniform discharge of water "W", as shown in FIG. 3.

BRIEF SUMMARY OF THE INVENTION

The primary objective of the present invention is to provide a change-over valve which is free of the drawbacks of the prior art change-over valve described above.

The change-over valve of the present invention comprises a connection portion, a main body, and a switch rod. The main body is provided with a slide slot in which the switch rod is slidably disposed. The switch rod is provided with two inner washers and two outer washers to ensure that the switch rod and the slide slot are leakproof. The main body is further provided with a water discharging cell in communication with the slide slot. The water discharging cell is provided with a water guiding member which is in turn provided in the center with a water discharging hole to facilitate the discharging of water in a uniform pattern.

The features and the functions of the present invention will be more readily understood upon a thoughtful deliberation of the following detailed description of a preferred embodiment of the present invention with reference to the accompanying drawings.

DETAILED DESCRIPTION OF THE INVENTION

Figure 1:
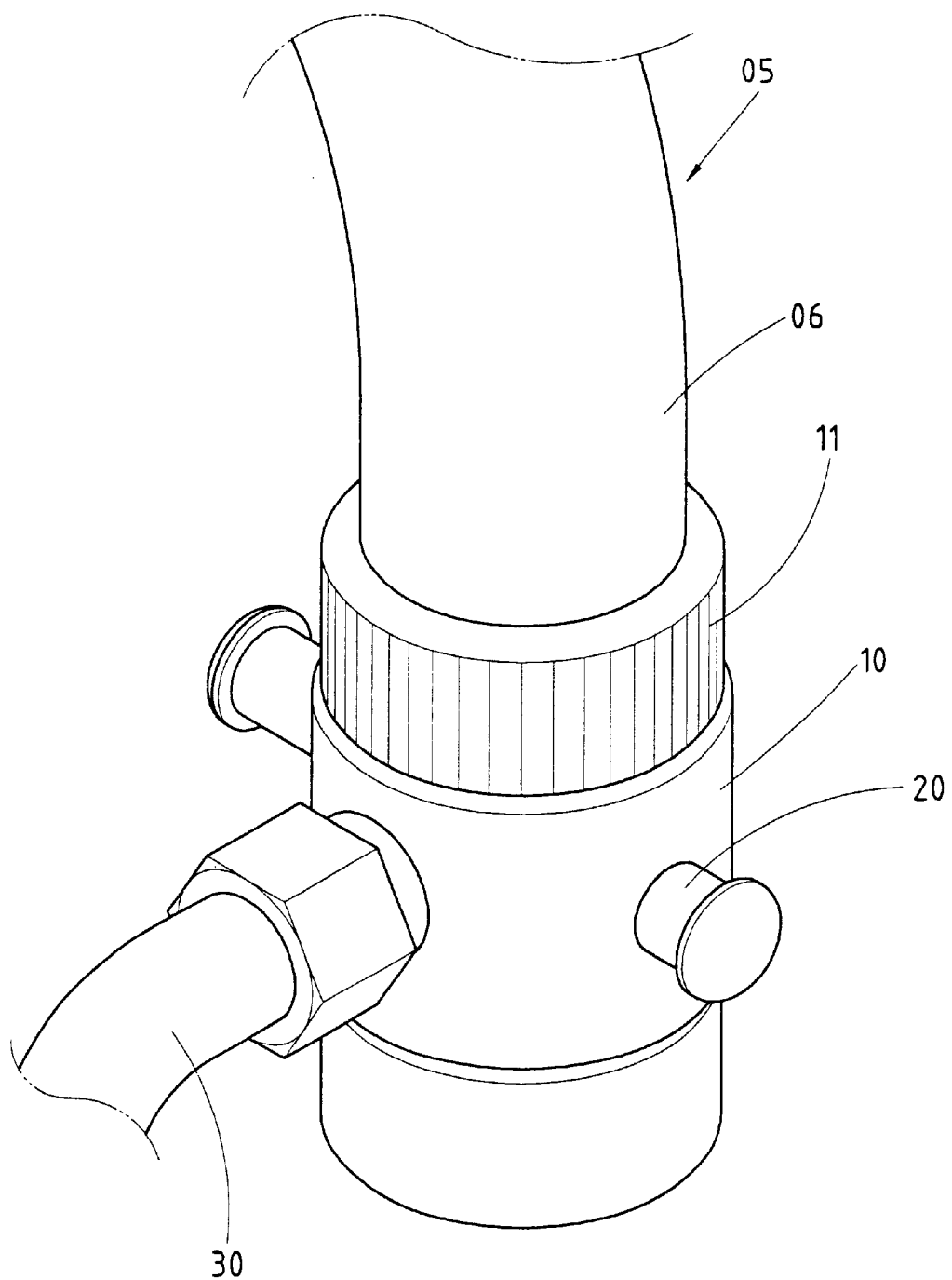
FIG. 1 shows a schematic view of a prior art change-over valve in use.
Figure 2:
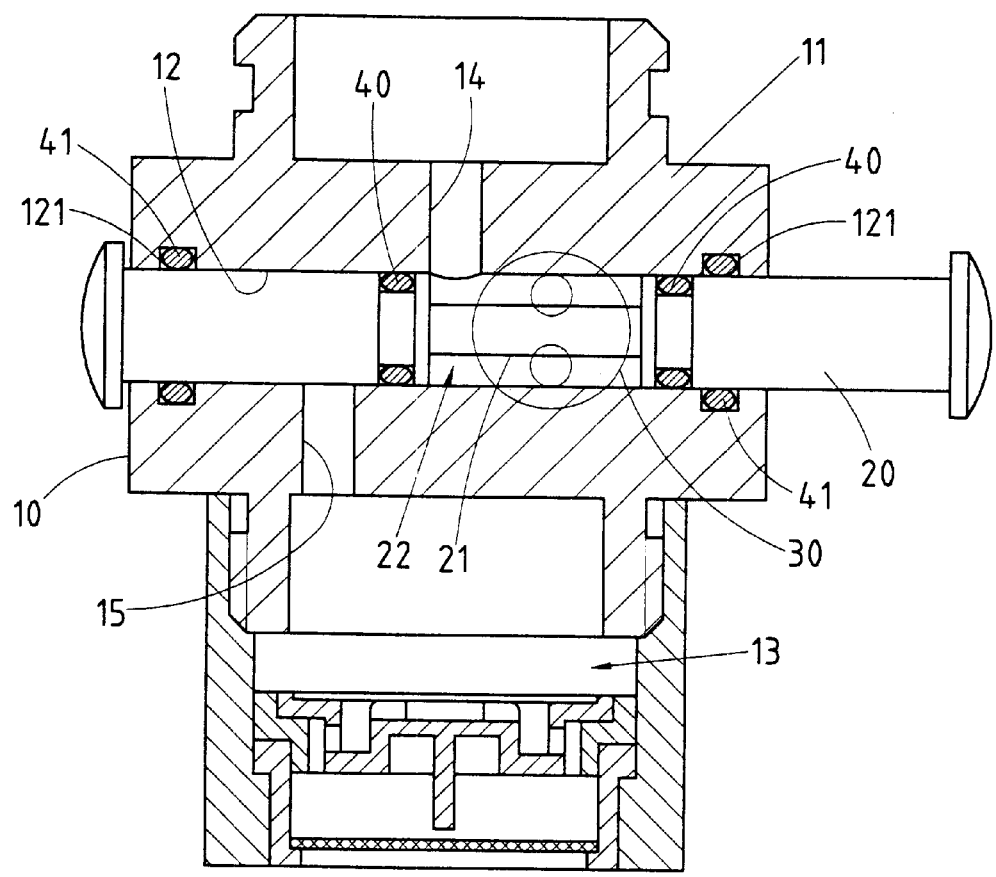
FIG. 2 shows a longitudinal sectional view of the prior art change-over valve as shown in FIG. 1.
Figure 3:
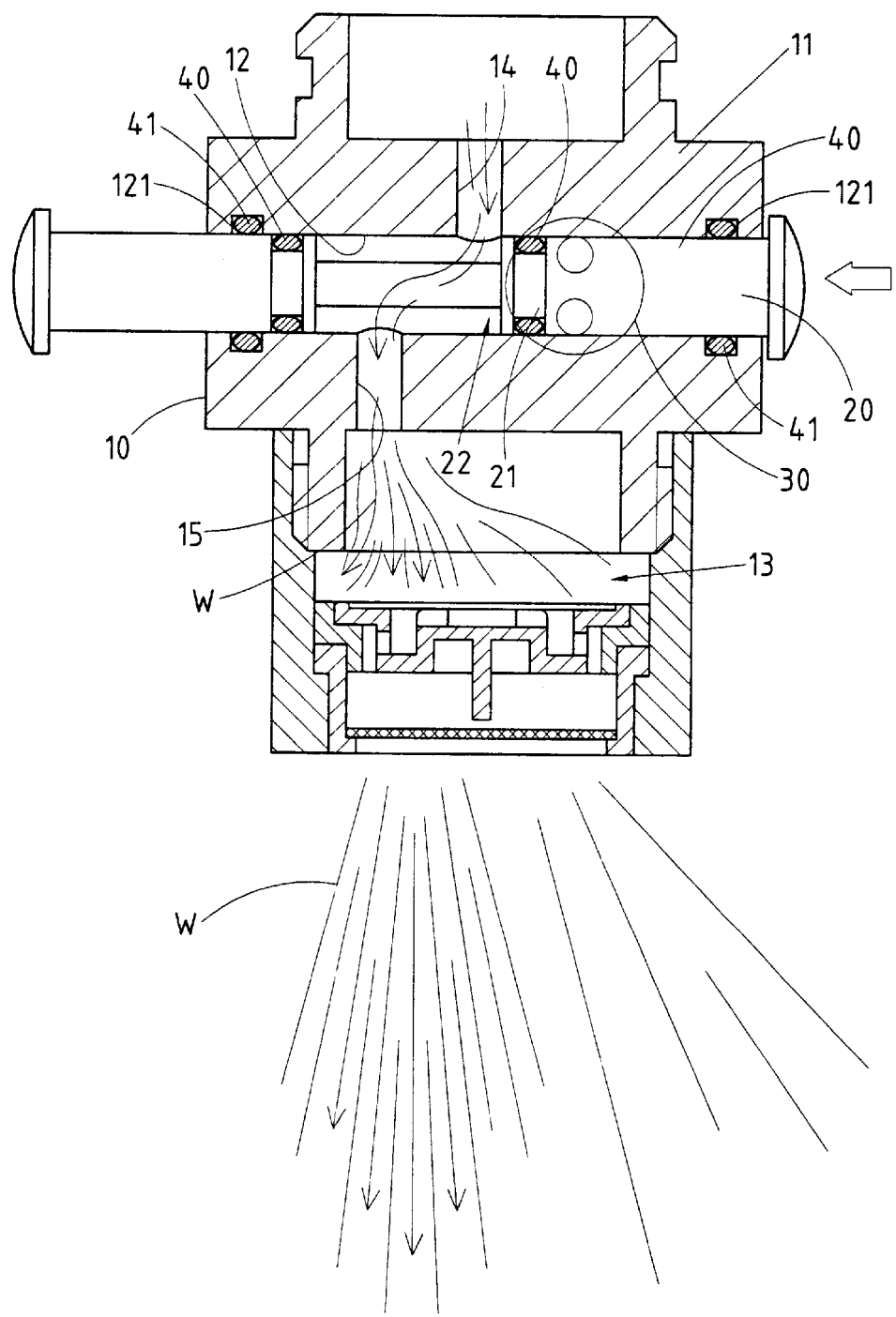
FIG. 3 shows a sectional schematic view of the prior art change-over valve at work.
Figure 4:
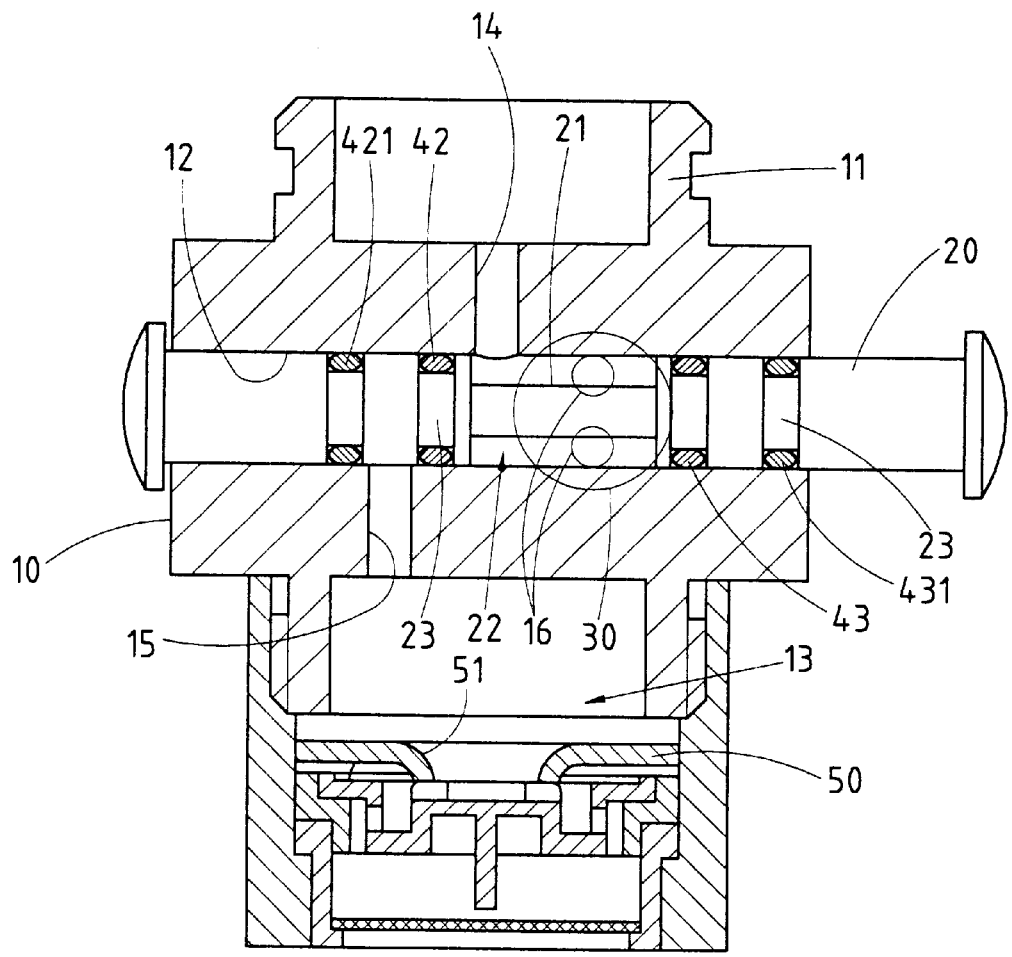
FIG. 4 shows a longitudinal sectional view of a change-over valve of the preferred embodiment of the present invention.
Figure 5:
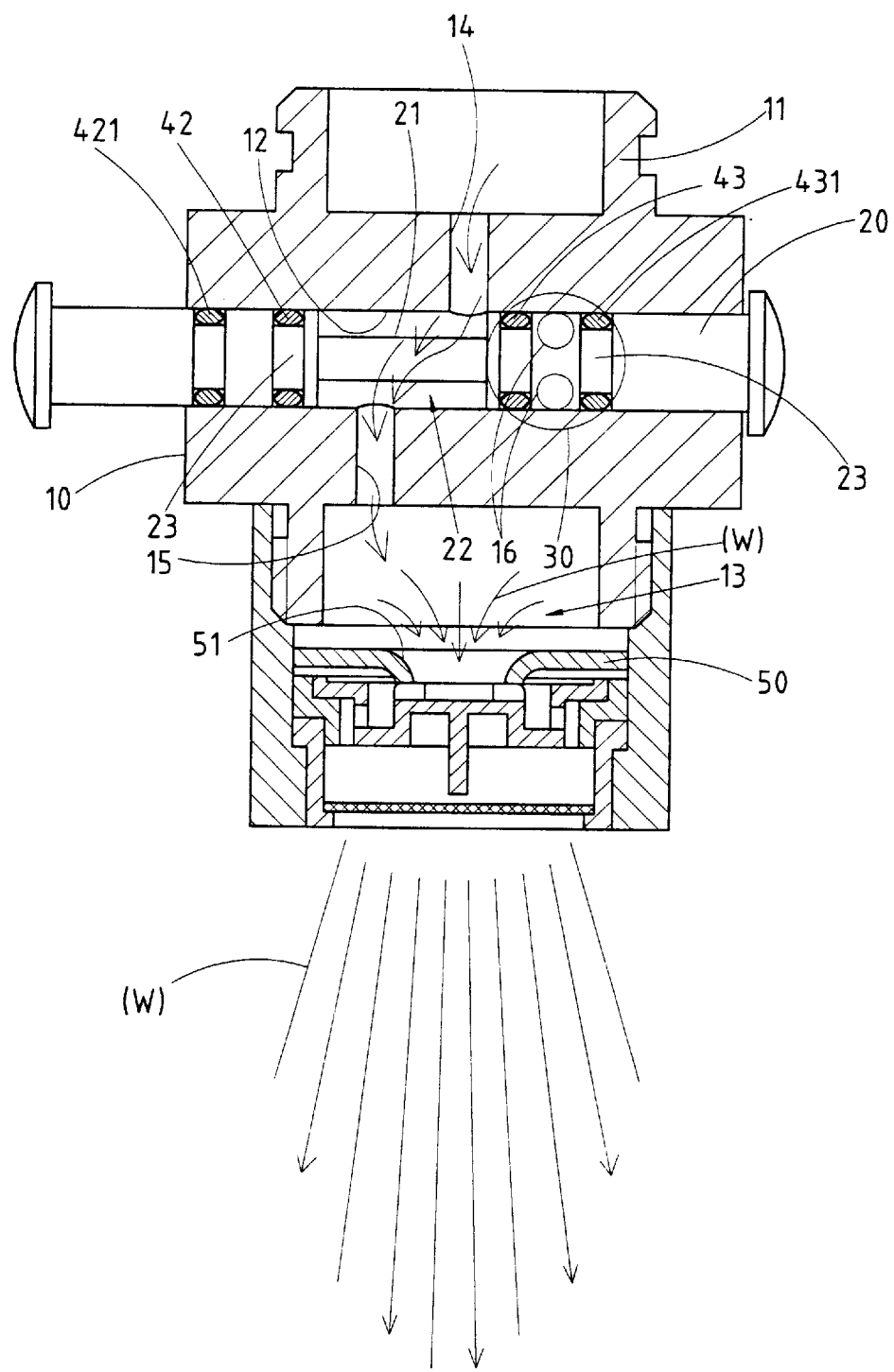
FIG. 5 shows a sectional schematic view of the preferred embodiment of the present invention at work.

As shown in FIGS. 4 and 5, a change-over valve of the preferred embodiment of the present invention comprises a main body 10, a connection portion 11, and a switch rod 20.

The main body 10 is provided in the interior with a slide slot 12 and a water discharging cell 13 in communication with the slide slot 12 via a water discharging channel 15. The slide slot 12 is provided with two connection ducts 16 in communication with a water filter inlet 30.

The connection portion 11 is fastened with the spout of a water faucet and is provided with a water inlet 14 in communication with the slide slot 12.

The switch rod 20 is slidably disposed in the slide slot 12 and is provided in the midsegment with a small diametrical portion 21, which forms along with the slide slot 12 a water slot capable of displacing along with the displacement of the switch rod 20 so as to enable the water inlet 14 of the connection portion 11 to be in communication with the water discharging channel 15 of the main body 10, as illustrated by the arrows in FIG. 5, or with the connection ducts 16 of the main body 10, as shown in FIG. 4.

The present invention is characterized by the switch rod 20 which is provided with four annular grooves 23 for locating four washers 42, 43, 421, and 431, with two washers 42 and 43 being located in proximity of the small diametrical portion 21 of the switch rod 20 for separating the flow paths of the water discharging channel 15 and the connection ducts 16 of the main body 10, and with other two washers 421 and 431 being located in proximity of the longitudinal ends of the switch rod 20 for preventing the leak of water "W", thereby making the switch rod 20 and the slide slot 12 leakproof.

The present invention is further characterized by the water discharging cell 13 which is provided with a water guiding member 50. The water guiding member 50 is provided at the center with a water hole 51 via which the water "W" is discharged uniformly, as illustrated in FIG. 5.

The embodiment of the present invention described above is to be regarded in all respects as being illustrative and nonrestrictive. Accordingly, the present invention may be embodied in other specific forms without deviating from the spirit thereof. The present invention is therefore to be limited only by the scope of the following claim.

I claim:

1. A change-over valve comprising:

a main body provided in an interior with a slide slot, a water discharging channel, and a water discharging cell in communication with said slide slot via said water discharging channel whereby said slide slot is provided with a connection duct in communication with the water inlet of a water filter;

a connection portion fastened at one end with said main body such that said connection portion is fastened at other end thereof with the spout of a water faucet, end that a water inlet of said connection portion is in communication with said slide slot of said main body; and a switch rod slidably disposed in said slide slot of said main body and provided in a midsegment with a small diametrical portion whereby said small diametrical portion forms along with said slide slot of said main body a water slot capable of displacing along with a displacement of said switch rod, thereby enabling said water inlet of said connection portion to be in communication with said water discharging channel of said main body, or with said connection duct of said main body;

wherein said switch rod is provided with four annular grooves for locating four washers, with two of said four washers being located in proximity of two opposite ends of said small diametrical portion of said switch rod for separating the flow paths of said water discharging channel and said connection duct of said main body, with other two of said four washers being located in proximity of the longitudinal ends of said switch rod for making said switch rod and said slide slot water proof;

wherein said water discharging cell of said main body is provided with a water guiding member whereby said water guiding member is provided at a center with a water hole.

* * * * *